US011947495B1

United States Patent
Emelyanov et al.

(10) Patent No.: US 11,947,495 B1
(45) Date of Patent: Apr. 2, 2024

(54) SYSTEM AND METHOD FOR PROVIDING A FILE SYSTEM WITHOUT DUPLICATION OF FILES

(71) Applicant: Virtuozzo International GmbH, Schaffhausen (CH)

(72) Inventors: Pavel Emelyanov, Moscow (RU); Alexey Kobets, Seattle, WA (US)

(73) Assignee: VIRTUOZZO INTERNATIONAL GMBH, Schaffhausen (CH)

( * ) Notice: Subject to any disclaimer, the term of this patent is extended or adjusted under 35 U.S.C. 154(b) by 0 days.

(21) Appl. No.: 16/731,866

(22) Filed: Dec. 31, 2019

(51) Int. Cl.
*G06F 16/174* (2019.01)
*G06F 16/182* (2019.01)

(52) U.S. Cl.
CPC ...... *G06F 16/1748* (2019.01); *G06F 16/1827* (2019.01)

(58) Field of Classification Search
CPC .......................... G06F 16/1748; G06F 16/1827
See application file for complete search history.

(56) References Cited

U.S. PATENT DOCUMENTS

| 2008/0097744 | A1* | 4/2008 | Levy | G06F 40/143 |
| | | | | 704/4 |
| 2018/0075152 | A1* | 3/2018 | Zhang | G06F 9/455 |
| 2018/0095973 | A1* | 4/2018 | Huang | G06F 8/63 |
| 2018/0287883 | A1* | 10/2018 | Joshi | G06F 9/45558 |
| 2019/0334909 | A1* | 10/2019 | Schmitt | G06F 3/0604 |

* cited by examiner

*Primary Examiner* — Hosain T Alam
*Assistant Examiner* — Anthony G Gemignani
(74) *Attorney, Agent, or Firm* — ArentFox Schiff LLP; Michael Fainberg (57) ABSTRACT

Disclosed herein are systems and method for providing a File System (FS) without redundancy for one or more services. In one aspect, an exemplary method comprises, mounting a base image of microservices to a directory, for each of the one or more services, union-mounting a service image on top of the base image, identifying all dependencies associated with the service image, and creating one or more sub-directories for each dependency associated with the service image, for each identified dependency, creating a link between the dependency and the union-mounted service image and base image, and creating, one or more microservices.

23 Claims, 8 Drawing Sheets

SYSTEM AND METHOD FOR PROVIDING A FILE SYSTEM WITHOUT DUPLICATION OF FILES

TECHNICAL FIELD

The present disclosure is generally related to the field of micro service layers creation, more specifically to systems and methods for providing a File System (FS) without redundancy for one or more services.

BACKGROUND

Applications and micro-services (MSs) may be considered as layers having dependencies (e.g., libraries). For clarity, a Micro-Service (MS) refers to an application that can be started in a predefined environment, having a clearly defined version, environment and dependencies.

The MS comprises a set of components. The MS is usually run in a container (e.g., stateless container). Dependency refers to any component which is necessary for launching and work of a respective application, MS or program. The dependencies are installed as packages. A set of layers composes a container root file system. A container image refers to a bundle that contains everything inside the container.

One approach for creating a FS is, for each MS, creating an independent layer for each micro service containing all needed dependencies for the MS. However, when multiple MSs depend on the same component, then the component is duplicated. For example, suppose two MSs have the same dependencies. Then, the dependencies are duplicated on memory, on disk, in memory cache (e.g., RAM), and I/O operations are either duplicated.

Therefore, there is a need of a system and method of creation of micro services is more efficient, e.g., by providing a FS without duplication of files that correspond to dependencies needed for multiple applications, MSs, programs, and the like.

SUMMARY

Accordingly, a system and method is provided for providing a file system without redundancy for one or more services, e.g., micro-services, applications, programs, and the like. In one aspect, the system comprises a computing device comprising a hardware processor configured to: mount a base image of microservices to a directory, for each of the one or more services, union-mount a service image on top of the base image, identify all dependencies associated with the service image, and create one or more sub-directories for each dependency associated with the service image, for each identified dependency, create a link between the dependency and the union-mounted service image and base image, and create, one or more micro-services.

In one aspect, a method is implemented in a computer comprising a hardware processor, the method comprising: mounting a base image of microservices to a directory, for each of the one or more services, union-mounting a service image on top of the base image, identifying all dependencies associated with the service image, and creating one or more sub-directories for each dependency associated with the service image, for each identified dependency, creating a link between the dependency and the union-mounted service image and base image, and creating, one or more micro-services.

In one aspect, one or more services comprising at least one of: an application, a program and a micro-service.

In one aspect, the FS is a Mosaic file system, the Mosaic FS being built such that relationships between components of the Mosaic FS are represented as a graph which contains cycles, the components of the Mosaic FS including at least two of the base image, the dependencies and one or more libraries.

In one aspect, the linking being performed using a bind mounts, hard links or symbolic links.

In one aspect, the created link between the dependency and the union-mounted service image and the base image is stored during an installation of a dependency.

In one aspect, the dependency is a package.

In one aspect, the installation of the dependency includes at least one of: a creation or a changing of one or more files on the FS.

In one aspect, the dependency comprises one or more packages that are intersecting packages, intersecting packages being created in a same directory during the installation.

In one aspect, the files are stored without redundancy, and wherein storing without redundancy implies that the files are created only once.

In one aspect, files that are the same are identified by comparing at least one of: hash values, file names, and build IDs.

In one aspect, a location is unique for a storage of a given dependency.

In one aspect, the identification of the dependency is based on a description of the dependency as one of: a string in a metadata of the service image, a list of file names that are needed, and a checksum of contents of the dependency.

In one aspect, the present disclosure describes a non-transitory computer readable medium storing thereon computer executable instructions for providing a file system without redundancy for one or more services, including instructions for: mounting a base image of microservices to a directory, for each of the one or more services, union-mounting a service image on top of the base image, identifying all dependencies associated with the service image, and creating one or more sub-directories for each dependency associated with the service image, for each identified dependency, creating a link between the dependency and the union-mounted service image and base image, and creating, one or more micro-services.

The new file system is built such that relationships between components of the file system (e.g., MSs, dependencies, libraries, base image, etc.) are represented as a graph which may contain cycles. In contrast, traditional approaches of a root file system are based on a graph with a tree like structure. In other words, graphs of the traditional FS are graphs without cycles.

The file system of the present disclosure has several advantages. The first advantage is removing duplication of files on disk as well as during execution (i.e., cache and I/O). A second advantage is to provide another way of packaging container images by defining an application as comprising both (1) the application itself, and (2) a stack of dependencies (or platform) for the application. Then, the application the user wants to pack and the platform stack are strictly distinguished. The platform stack and the application are combined upon a container start. Combining the platform stack and the application simplifies tasks performed on the container as well as for running services inside the container.

The above summary of example aspects serves to provide an understanding of the teachings of the present disclosure.

This summary is not an extensive overview of all contemplated aspects, and is intended to neither identify key or critical elements of all aspects nor delineate the scope of any or all aspects of the disclosure. Its sole purpose is to present one or more aspects in a concise form as a prelude to the more detailed description of the disclosure that follows. To the accomplishment of the foregoing, the one or more aspects of the methods and systems of the present disclosure include the features described and particularly pointed out in the claims.

BRIEF DESCRIPTION OF THE DRAWINGS

The accompanying drawings, which are incorporated into and constitute a part of this specification, illustrate one or more example aspects of the invention and, together with the detailed description, serve to explain their principles and implementations.

DETAILED DESCRIPTION

Various exemplary aspects are now described with reference to the drawings, wherein like reference numerals are used to refer to like elements throughout. In the following description, for purposes of explanation, numerous specific details are set forth in order to promote a thorough understanding of one or more aspects. It may be evident in some or all instances, however, that any aspect described below can be practiced without adopting the specific design details described below. In other instances, well-known structures and devices are shown in block diagram form in order to facilitate description of one or more aspects. The following presents a description of one or more exemplary aspects in order to provide a basic understanding of the disclosed system and method. This description is not an extensive overview of all contemplated aspects, and is not intended to identify key or critical elements of all aspects nor delineate the scope of any or all aspects.

In one aspect, the present disclosure describes a method and system for providing a File System (FS) without redundancy for one or more services. In order to more clearly present the teachings of the present disclosure, the inefficiency addressed by the disclosure is described herein in conjunction with FIG. 1. The file system of the present disclosure may also be referred to as a new file system or a Mosaic file system. The Mosaic FS places files such that the files are not duplicated in memory (e.g., RAM), disk, cache, or I/O, when the dependencies are needed by a plurality of applications, micro-services, and programs, and the like. In addition, the files are placed at locations at which the applications, micro-services, and/or programs expect to locate the files.

Figure 1:
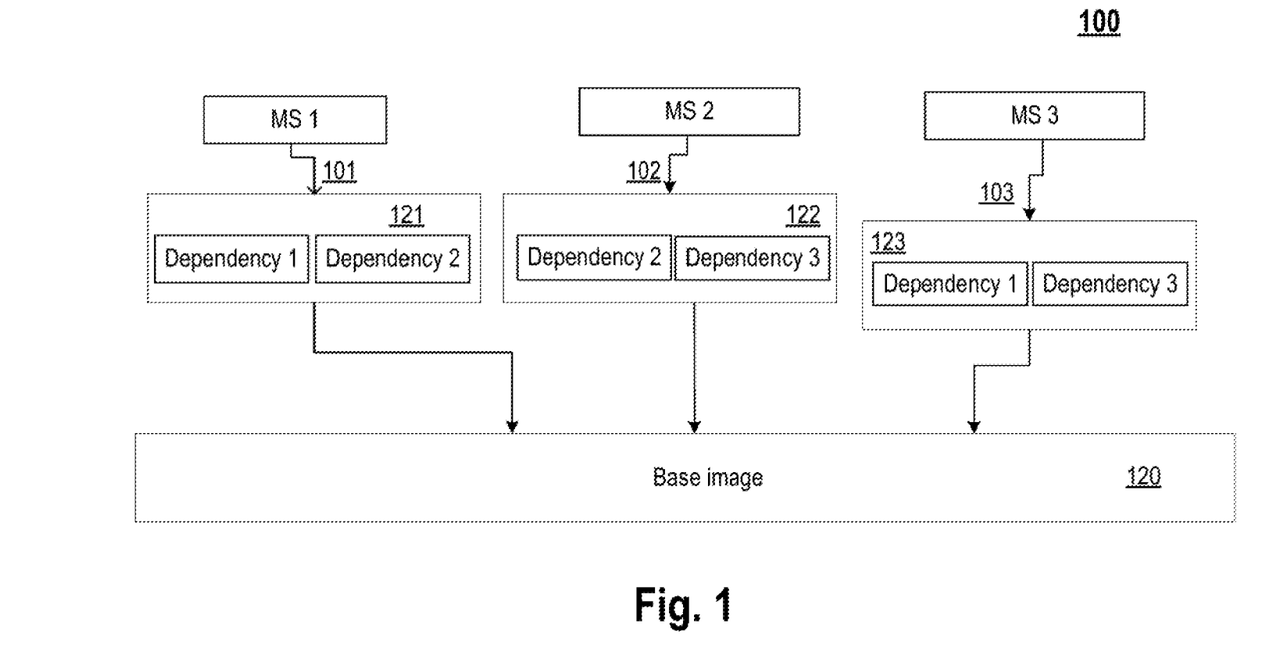
FIG. 1 is a block diagram illustrating an exemplary file system with duplication of dependencies.

FIG. 1 is a block diagram illustrating an conventional file system 100 with duplication of dependencies. The file system 100 is shown for micro-services for the example scenario. However, the file system may be for an application, program, etc. which can be started in a pre-defined environment. The file system 100 includes dependencies for three micro-services: MS 1, MS 2 and MS 3. MS 1 depends on dependencies 1 and 2, as shown in 101. MS 2 depends on dependencies 2 and 3, as shown in 102. MS 3 depends on dependencies 1 and 3, as shown in 103. In standard approaches, the file system 100 built by: creating a base image 120; creating layers 121-123 that are independent of each other, each layer of the layers 121-123 corresponding to one MS; and mapping files from a respective layer of layers 121-123 to memory when the respective MS is to be started. The mapping is performed for execution of the MS. As readily shown in FIG. 1, layer 121 contains dependencies 1 and 2, layer 122 contains dependencies 2 and 3, and layer 123 contains dependencies 1 and 3. Since both MS 1 and MS 3 depend on dependency 1, dependency 1 lays on disk in two instances, during execution, the disk cache and I/O are also duplicated. Similarly, dependencies 2 and 3 also lay on disk in two instances, and during execution, the disk cache and I/O are duplicated.

Figure 2:
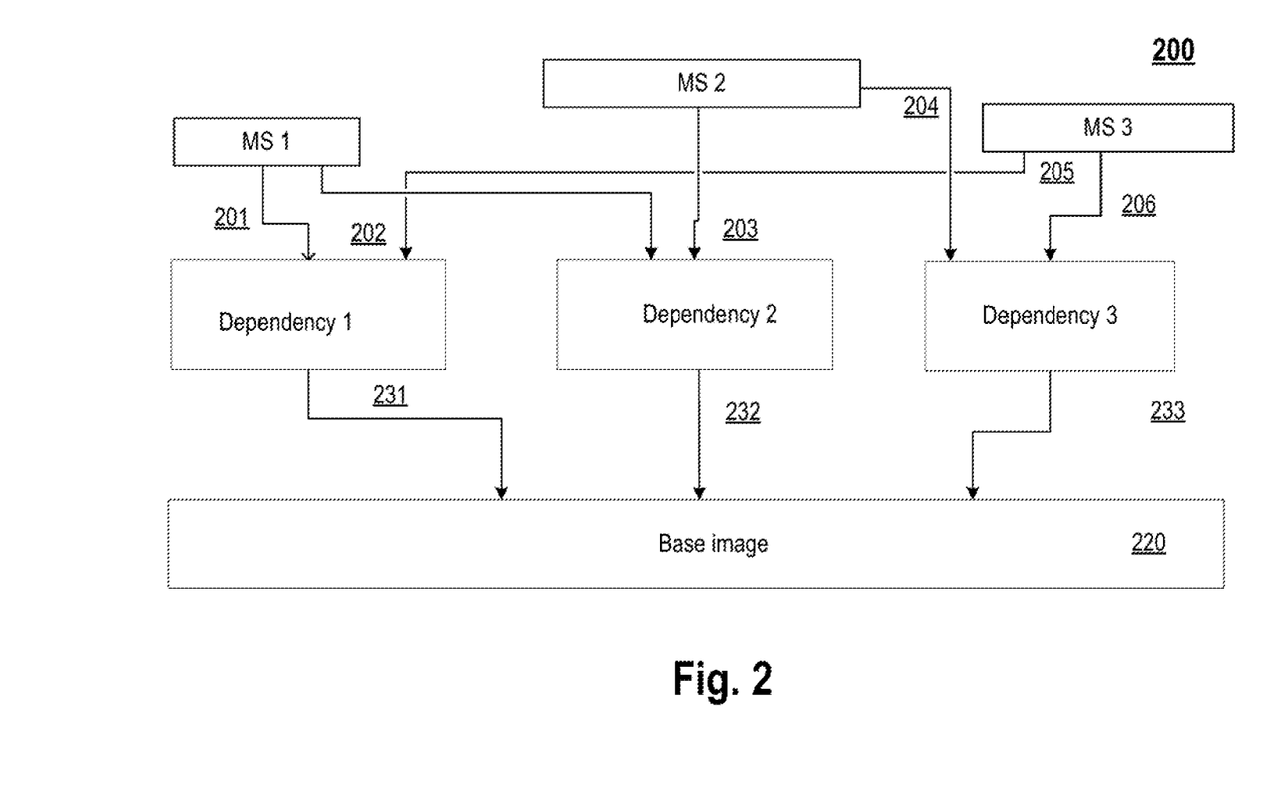
FIG. 2 is a block diagram illustrating an exemplary file system without duplication of dependencies.

FIG. 2 is a block diagram illustrating an exemplary system 200 without duplication of dependencies. In one aspect, the system 200 comprises a Mosaic file system built such that relationships between components of the file system (FS) are represented as a graph which contains cycles. The components of the FS include at least two of: the base image, the service image/layers (not shown, may be located between the base image and the dependencies, in one aspect, the service image can be union-mounted on top of the base image), the dependencies and one or more libraries. The system 200 includes dependencies for three micro-services: MS 1, MS 2 and MS 3. (MS 1, 2, 3 shown on the figure correspond the micro services started from the service's images located in the file system.) MS 1 depends on dependencies 1 and 2, as shown in 201 and 202. MS 2 depends on dependencies 2 and 3, as shown in 203 and 204. MS 3 depends on dependencies 1 and 3, as shown in 205 and 206. The file system on 200 is built by: creating a base image (e.g., a base image that includes packages, dependencies, other programs, etc.); identifying all dependencies; for each identified dependency, storing files for the dependency at a respective location in a directory of a FS. For example, a base image 220 may be created, and dependencies 231, 232 and 233 may be identified. Files for dependencies 231, 232 and 233 may then be stored in the directory of the FS, as illustrated in FIG. 3.

Figure 3:
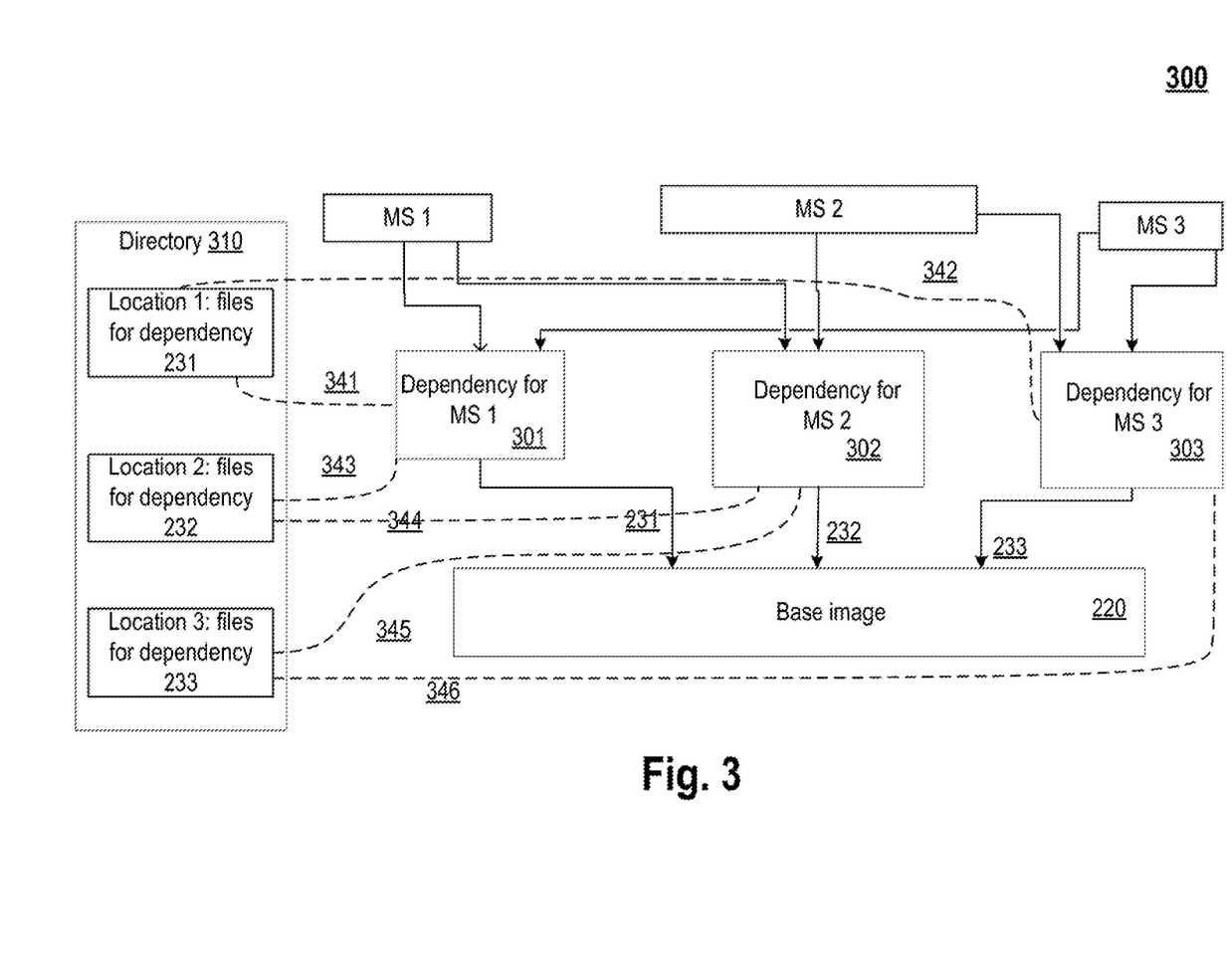
FIG. 3 is a block diagram illustrating an exemplary file system of the present disclosure.

FIG. 3 is a block diagram illustrating an exemplary Mosaic file system 300 of the present disclosure. The Mosaic FS 300 is being used for the dependencies described above in conjunction with FIG. 2. The system 300 includes a directory 310 for placing files for each dependency. Files for dependency 231 are placed at location 1, files for dependency 232 are placed at location 2, and files for dependency 233 are placed at location 3.

Once the files for the dependencies are placed at respective locations, the MSs may be created for one or more services. In one aspect, the one or more services comprise at least one of: an application, a program and a micro-service.

In one aspect, the dependency is a package. In one aspect, the dependency comprises one or more packages that are intersecting packages, intersecting packages being created in one directory during an installation.

In one aspect, the creation of an MS in accordance with the disclosure comprises: mounting a base image of microservice to a directory, for each of the one or more services, union-mounting a service image on top of the base image, identifying all dependencies associated with the service image, and creating one or more sub-directories for each dependency associated with the service image, for each identified dependency, creating a link between the dependency and the union-mounted service image and base image, and creating, one or more micro-services, the creation of a particular micro-service of the one or more services comprising: for each dependency of the particular service, linking respective stored files and the sub-directory. In one aspect, the creation may further comprise for each identified dependency, storing files for the dependency without redundancy at a respective location, if no such dependency is installed in the system. In one aspect, creation may further comprise for each identified dependency creating a link to dependency files. The link creation can be in 2 variants as a) union-mounting the files and directories and b) creating file links between service file system and dependency store.

In one aspect, the identification of the dependency is based on a description of the dependency as one of: a string in a metadata of the service image, a list of file names that are needed, and a checksum of contents of the dependency. In one aspect, the linking is performed using a bind mounts, hard links or symbolic links. In one aspect, the created link between the dependency and the union-mounted service image is created during an installation of a dependency. In one aspect, a location for a storage of a given dependency is unique. In one aspect, the files are stored without redundancy, i.e., the files are created only once. In one aspect, files that are the same are identified by comparing at least one of: hash values, file names, and build IDs. In one aspect, the installation of the dependency includes at least one of a creation or a changing of one or more files on the FS.

Returning to the example of FIG. 3, layers 301, 301 and 303 are created for MSs 231, 232 and 233, respectively. Then, since each of the MSs have two dependencies, two empty subdirectories are created in each of the layers 301, 302 and 303. Then, files from the directory at location 1 (i.e., dependency 231) are linked to a subdirectory in 301 as shown in 341, files from the directory at location 1 are linked to a subdirectory in 303 as shown in 342, files from the directory at location 2 are linked to a subdirectory in 301 as shown in 343, files from the directory at location 2 are linked to a subdirectory in 302 as shown in 344, files from the directory at location 3 are linked to a subdirectory in 302 as shown in 345, and files from the directory at location 3 are linked to a subdirectory in 303 as shown in 346.

In one aspect, a file system, which will store all layers only as one instance (e.g., root FS for a container starting on a host) is prepared as follows. The root FS is built from 3 components: base image, container image (also called here as service image), dependencies (container packages). To prepare the root FS the following steps are taken: the container root directory is created on a host FS; the base image is mounted to this directory; the container image is union-mounted on top of base image, e.g., using the union- or overlay-file system. The union-mount results in a FS tree with files joined from base and container images. When the service (that is started in the container) attempts to access its files, they are taken from container image (if present), files missing on container image files are taken from base image, special "whiteout" files on container image result in "no file".

In another aspect, it is prepared as follows. All dependencies are identified. On microsevice creation step (instead of creating a new layer for each dependency) a new directory is created and bindmounts (or another kind if links) to the places, where needed layers are installed are put into the directory; then the microservice can be started.

In one aspect, package (i.e., dependency) name may include package version, respectively same names with different versions refer to different set of files. Package consists of one or more sub-trees where each subtree is a directory (with all sub-dis and files belonging to this package only) or individual file. In one aspect, the packages are hide-mounted into respective container-image directories. The hide-mount of a package comprises: each package consists of one or more "sub-directories" where only this package's files are stored; each package sub-directory is bind-mounted into respective path of container image, thus hiding any files or directories that may already be there.

Figure 4:
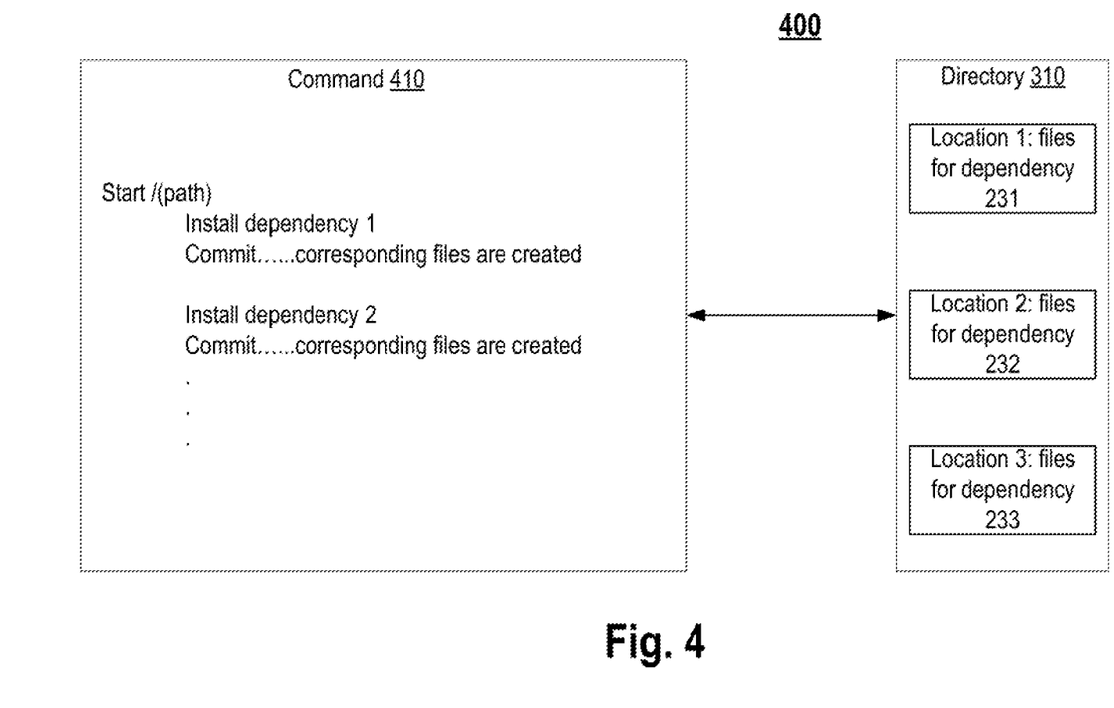
FIG. 4 is a block diagram illustrating an exemplary file system and commands.

FIG. 4 is a block diagram illustrating an exemplary file system 400 and commands in one exemplary aspect. The directory 310 is populated by executing commands for installation of files for each identified dependency. For example, command 410 may be to start installation of a package of dependencies. When a package is installed, the package creates or changes files on the file system. For example, the command "install" performs installation of a package and the command "commit" identifies what was changed on the file system during installation. Then, for each dependency in the package, the files are identified, placed at a given location, and the location of the files is recorded. The system knows which files or directories with files correspond to each dependency.

In one aspect, files corresponding to a package are put in a separate directory. In one aspect, different packages use (create, change, etc.) different files on the FS (e.g., files in different directories, files with different names, etc.). Then, the different packages may be referred to as "not intersecting" or "none-intersecting." In another aspect, the different packages may be intersecting packages (i.e., use same files on the FS). The intersecting packages do not create a separate directory during installation. In one aspect, when the packages are intersecting packages, the method may perform special actions. In one aspect, the method of the present disclosure further determines whether or not files corresponding to different packages are intersecting.

Figure 5:
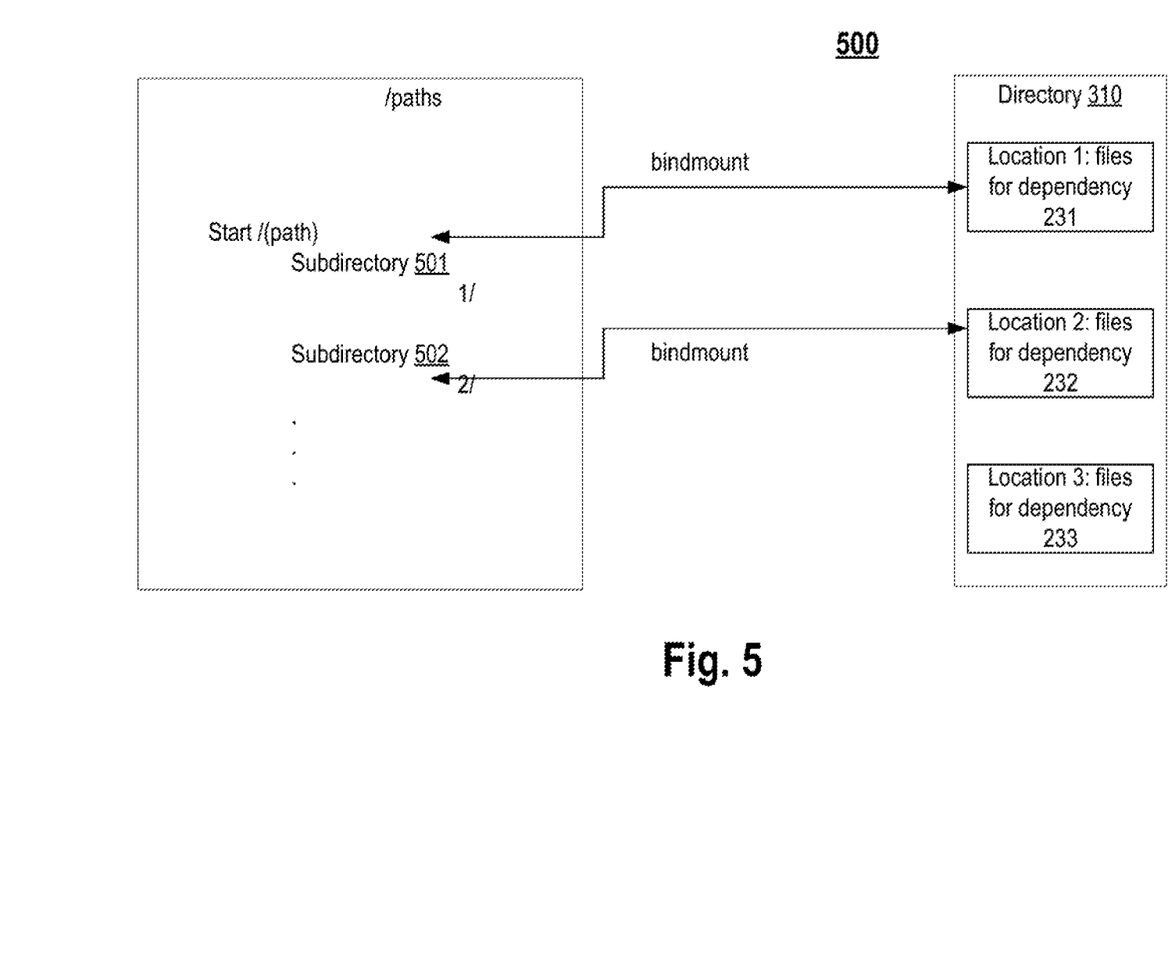
FIG. 5 is a block diagram illustrating an exemplary file system using bind-mounts.

FIG. 5 is a block diagram illustrating an exemplary file system 500 using bindmounts. The bindmounts are used to link files from a directory of the FS at which the files needed for the dependency are placed to a subdirectory created for an MS. It is noted that the linking may be done by various ways: bind mounts, symbolic links, hard links, etc. For instance, a directory containing files can be bind mounted to a directory in a layer. For the example of FIG. 5, the files for dependency 1 (i.e., item 231 as shown in FIG. 3) are linked to subdirectory 501 created for MS 1 using bindmounts. Similarly, the files for dependency 2 (i.e., item 232 as shown in FIG. 3) are linked to subdirectory 502 created for MS 1. Note that files for dependencies are not copied from the directory 310 to the layer 301. Instead, empty subdirectories 501 and 502 are created in layer 301, and needed files are linked from the directory 310 to respective subdirectories (501 or 502) in the layer 301.

Figure 6:
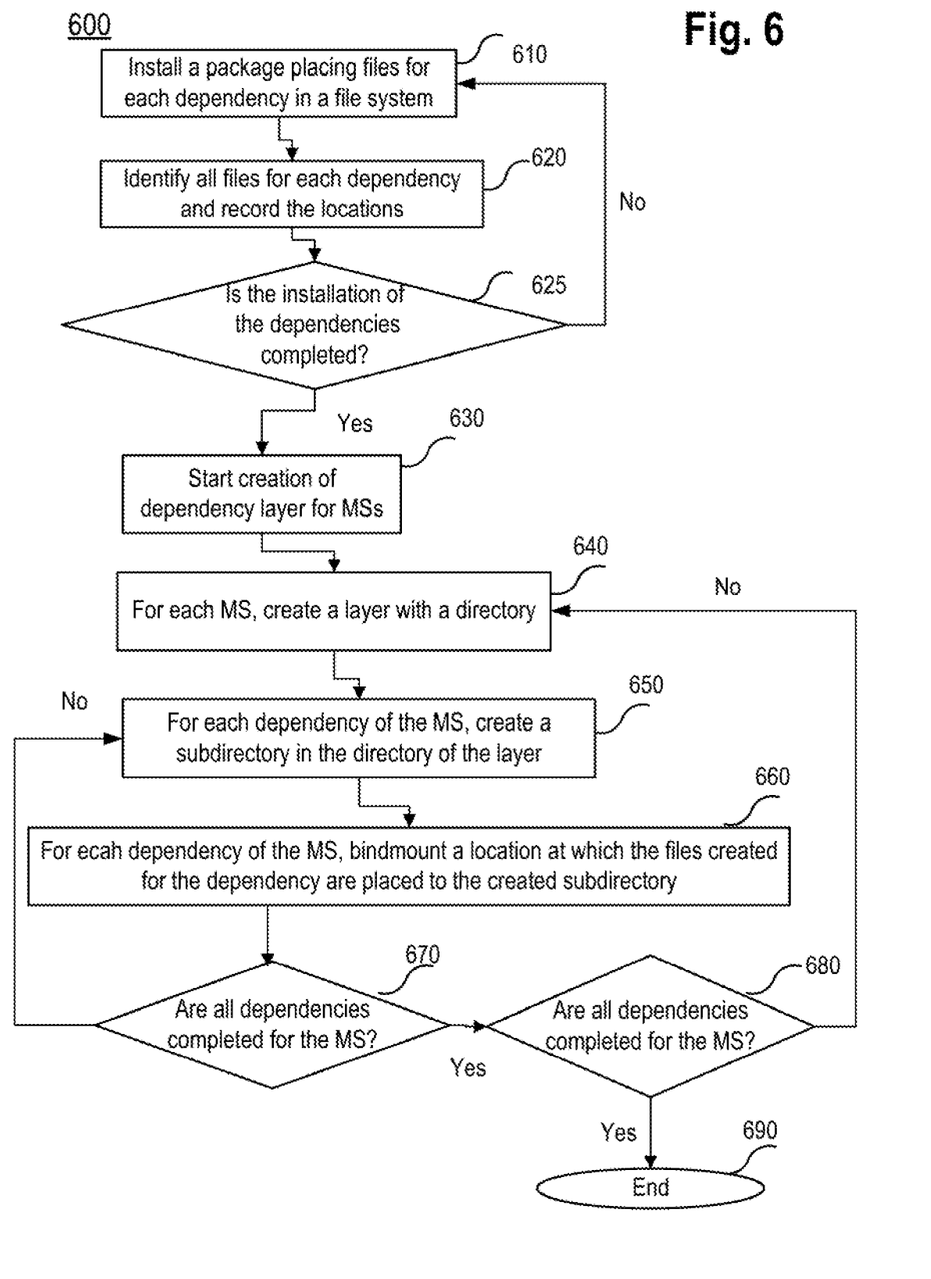
FIG. 6 is a flow diagram illustrating an exemplary method for providing a file system for one or more services in accordance with the teachings of the disclosure.

FIG. 6 is a flow diagram illustrating an exemplary method 600 for providing a file system for one or more services in accordance with the teachings of the disclosure. The method 600 may be carried out with the aid of the system described in FIG. 2. The method 600 starts in step 601 and proceeds to step 610.

In step 610, the method installs a package. In one aspect, the installation comprises placing files needed for each dependency of the package in the Mosaic file system of the present disclosure.

In step 620, the method identifies all files created for the dependencies in step 610 and records their locations.

In step 625, the method determines whether the installation of the dependencies is completed. When the installation of the dependencies is completed, the method proceeds to step 630. Otherwise the method returns to step 610 to continue the installation of dependencies.

In step 630, the method starts creation of dependency layers for MSs.

In step 640, the method creates, for a given MS, a layer with a directory.

In step 650, for each dependency of the given MS, the method creates a subdirectory in the directory of the layer.

In step 660, for each dependency of the given MS, the method bindmounts a location at which the files created for the dependency are placed (i.e., locations from step 610 as recorded in step 620) to the created subdirectory.

In step 670, the method determines whether all dependencies are completed for the MS. If all dependencies are completed, the method proceeds to step 680. Otherwise, the method proceeds to step 650 until all dependencies are processed for the given MS.

In step 680, the method determines whether all MSs are processed. If all MSs are processed, the method proceeds to step 690 to end the installation/creation of the FS. Otherwise, the method returns to step 640.

Figure 7:
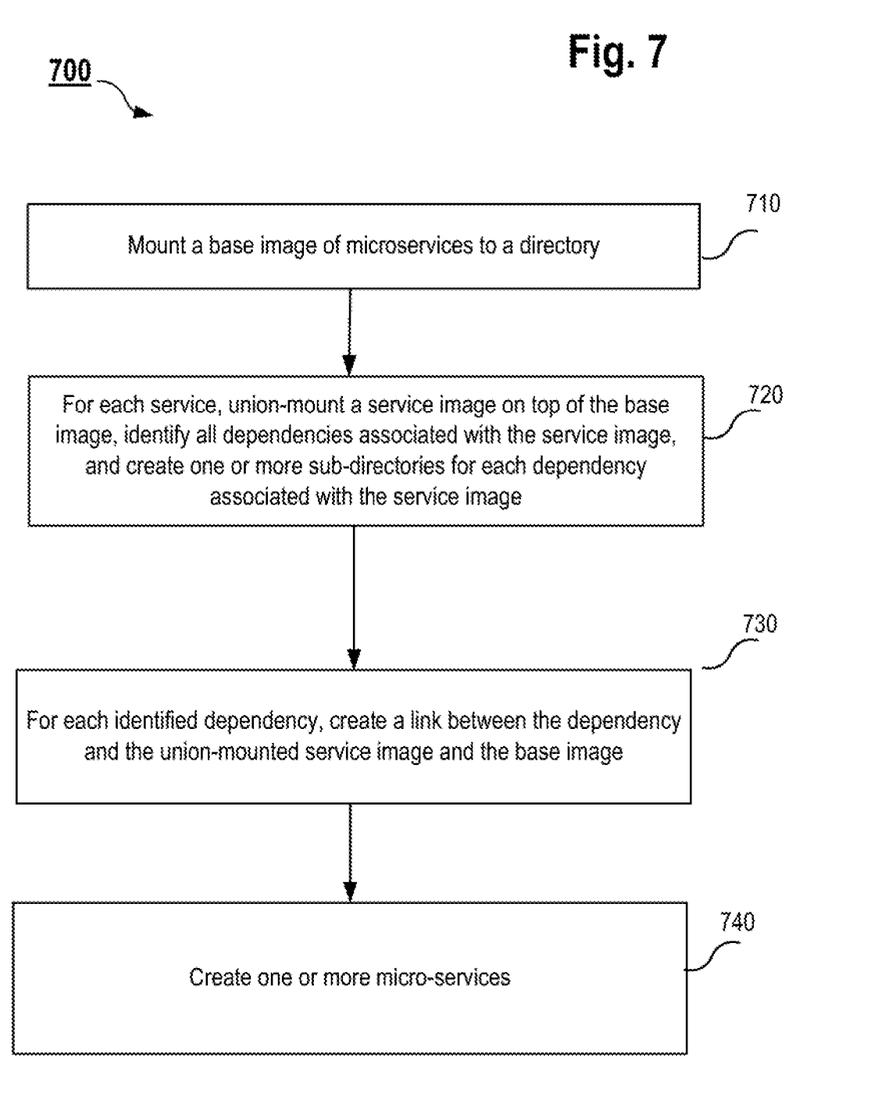
FIG. 7 is a flow diagram of the method for providing a file system for one or more services in accordance with the teachings of the disclosure.

FIG. 7 is a flow diagram illustrating a method 700 for providing a file system for one or more services in accordance with the teachings of the disclosure.

In step 710, method 700 mounts a base image of the FS to a directory.

In step 720, for each of the one or more services, method 700 union-mounts a service image on top of the base image, identifies all dependencies associated with the service image, and creates one or more sub-directories for each dependency associated with the service image.

In step 730, for each identified dependency, method 700 creates a link between the dependency and the union-mounted service image and base image.

In step 740, method 700 creates, one or more micro-services, the creation of a particular micro-service of the one or more services comprising: for each dependency of the particular service, linking respective stored files and the sub-directory.

As described above, the file system (Mosaic) is built such that relationships between components of the file system (e.g., MSs, dependencies, libraries, base image, etc.) are represented as a graph which may contain cycles. In contrast, traditional approaches of a root file system are based on a graph with a tree like structure. In other words, graphs of the traditional file systems are graphs without cycles.

The file system of the present disclosure has several advantages. As described above, the first advantage is removing duplication of files on disk as well as during execution (i.e., cache and I/O). A second advantage is to provide another way of packaging container images. In contrast to systems in which an application is defined as a locked-in bundle of software, the new way defines an application as comprising both (1) the application itself, and (2) a stack of dependencies (or platform) for the application. Then, the application the user wants to pack and the platform stack are strictly distinguished. For example most of Docker applications require apache to run on. Therefore, the platform stack is the base image plus apache, which comes outside of the bundle, and the application itself is the application binaries and other files. In the new way of packaging the container images, the platform stack (e.g., which contains the base image plus apache) and the application itself (which contains the app binaries and other files) are combined upon a container start. The new way of packaging the container images is advantageous for performing tasks on the container and for running services inside the containers. In one example, an upgrade, e.g., a security upgrade, may need to be performed for containers. The new way of packaging provides a file system that is relatively easier for implementing the upgrade. The container images are packaged to include the platform stack and the application itself, and the container is then upgraded, as needed. In contrast, the file system of FIG. 1 provides no simple way to upgrade a large number of running containers without poking their respective owners. In another example, complex application may need to run side-services to do some additional work, e.g., cron jobs, log rotate, backups, etc. The new way of packaging container images simplifies running of side-services either together or inside the application containers.

Figure 8:
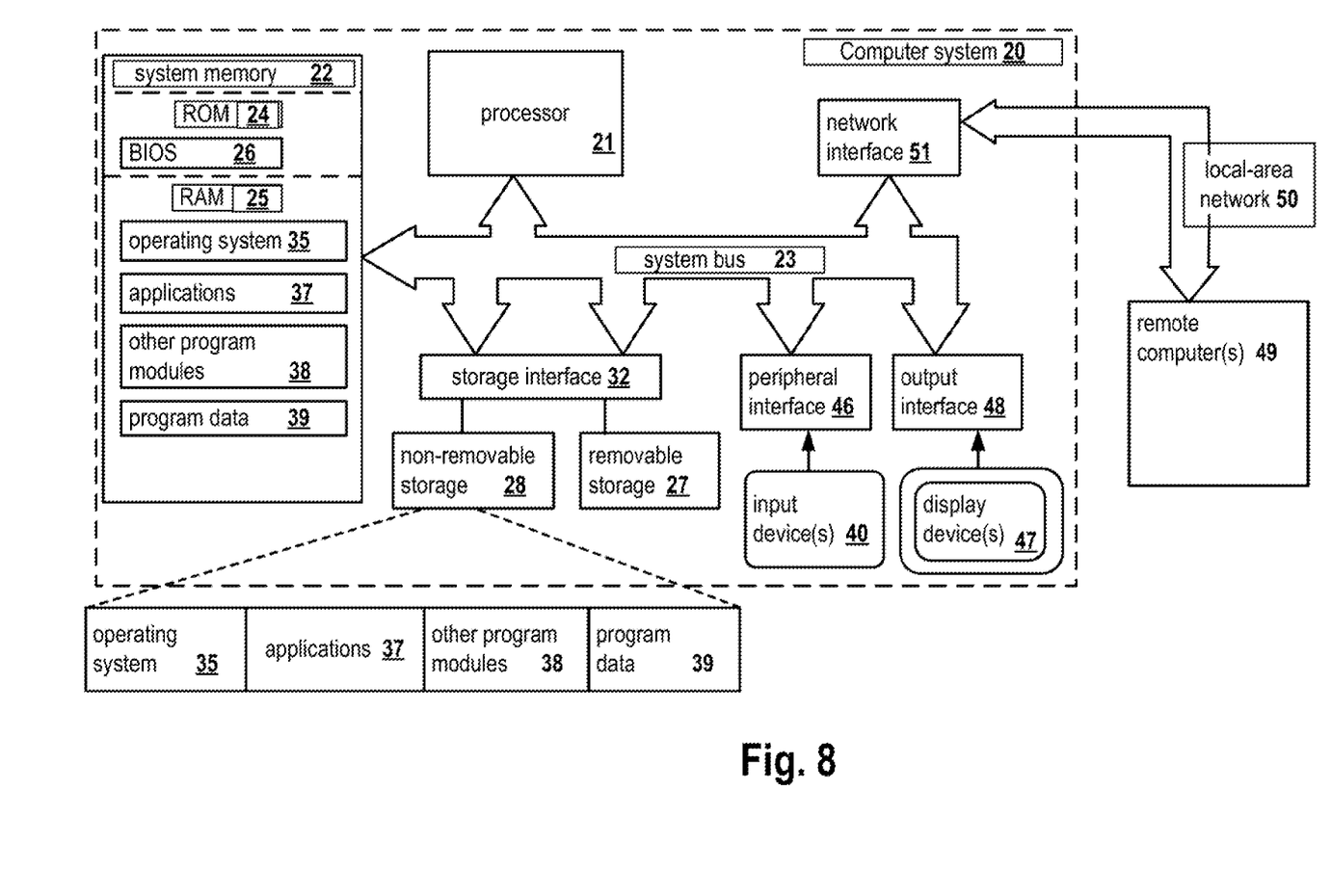
FIG. 8 is a block diagram illustrating a general-purpose computer system on which aspects of the present disclosure may be implemented in accordance with an exemplary aspect.

FIG. 8 is a block diagram illustrating a computer system 20 on which aspects of systems and methods for providing a File System (FS) without redundancy for one or more services in accordance with an exemplary aspect. The computer system 20 can be in the form of multiple computing devices, or in the form of a single computing device, for example, a desktop computer, a notebook computer, a laptop computer, a mobile computing device, a smart phone, a tablet computer, a server, a mainframe, an embedded device, and other forms of computing devices.

As shown, the computer system 20 includes a central processing unit (CPU) 21, a system memory 22, and a system bus 23 connecting the various system components, including the memory associated with the central processing unit 21. The system bus 23 may comprise a bus memory or bus memory controller, a peripheral bus, and a local bus that is able to interact with any other bus architecture. Examples of the buses may include PCI, ISA, PCI-Express, Hyper-Transport™, InfiniBand™, Serial ATA, I²C, and other suitable interconnects. The central processing unit 21 (also referred to as a processor) can include a single or multiple sets of processors having single or multiple cores. The processor 21 may execute one or more computer-executable code implementing the techniques of the present disclosure. The system memory 22 may be any memory for storing data used herein and/or computer programs that are executable by the processor 21. The system memory 22 may include volatile memory such as a random access memory (RAM) 25 and non-volatile memory such as a read only memory (ROM) 24, flash memory, etc., or any combination thereof. The basic input/output system (BIOS) 26 may store the basic procedures for transfer of information between elements of the computer system 20, such as those at the time of loading the operating system with the use of the ROM 24.

The computer system 20 may include one or more storage devices such as one or more removable storage devices 27, one or more non-removable storage devices 28, or a combination thereof. The one or more removable storage devices 27 and non-removable storage devices 28 are connected to the system bus 23 via a storage interface 32. In an aspect, the storage devices and the corresponding computer-readable storage media are power-independent modules for the storage of computer instructions, data structures, program modules, and other data of the computer system 20. The system memory 22, removable storage devices 27, and non-removable storage devices 28 may use a variety of computer-readable storage media. Examples of computer-readable storage media include machine memory such as cache, SRAM, DRAM, zero capacitor RAM, twin transistor RAM, eDRAM, EDO RAM, DDR RAM, EEPROM, NRAM, RRAM, SONOS, PRAM; flash memory or other memory technology such as in solid state drives (SSDs) or flash drives; magnetic cassettes, magnetic tape, and magnetic disk storage such as in hard disk drives or floppy disks; optical storage such as in compact disks (CD-ROM) or digital versatile disks (DVDs); and any other medium which may be used to store the desired data and which can be accessed by the computer system 20.

The system memory 22, removable storage devices 27, and non-removable storage devices 28 of the computer system 20 may be used to store an operating system 35, additional program applications 37, other program modules 38, and program data 39. The computer system 20 may include a peripheral interface 46 for communicating data from input devices 40, such as a keyboard, mouse, stylus, game controller, voice input device, touch input device, or other peripheral devices, such as a printer or scanner via one or more I/O ports, such as a serial port, a parallel port, a universal serial bus (USB), or other peripheral interface. A display device 47 such as one or more monitors, projectors, or integrated display, may also be connected to the system bus 23 across an output interface 48, such as a video adapter. In addition to the display devices 47, the computer system 20 may be equipped with other peripheral output devices (not shown), such as loudspeakers and other audiovisual devices The computer system 20 may operate in a network environment, using a network connection to one or more remote computers 49. The remote computer (or computers) 49 may be local computer workstations or servers comprising most or all of the aforementioned elements in describing the nature of a computer system 20. Other devices may also be present in the computer network, such as, but not limited to, routers, network stations, peer devices or other network nodes. The computer system 20 may include one or more network interfaces 51 or network adapters for communicating with the remote computers 49 via one or more networks such as a local-area computer network (LAN) 50, a wide-area computer network (WAN), an intranet, and the Internet. Examples of the network interface 51 may include an Ethernet interface, a Frame Relay interface, SONET interface, and wireless interfaces.

Aspects of the present disclosure may be a system, a method, and/or a computer program product. The computer program product may include a computer readable storage medium (or media) having computer readable program instructions thereon for causing a processor to carry out aspects of the present disclosure.

The computer readable storage medium can be a tangible device that can retain and store program code in the form of instructions or data structures that can be accessed by a processor of a computing device, such as the computing system 20. The computer readable storage medium may be an electronic storage device, a magnetic storage device, an optical storage device, an electromagnetic storage device, a semiconductor storage device, or any suitable combination thereof. By way of example, such computer-readable storage medium can comprise a random access memory (RAM), a read-only memory (ROM), EEPROM, a portable compact disc read-only memory (CD-ROM), a digital versatile disk (DVD), flash memory, a hard disk, a portable computer diskette, a memory stick, a floppy disk, or even a mechanically encoded device such as punch-cards or raised structures in a groove having instructions recorded thereon. As used herein, a computer readable storage medium is not to be construed as being transitory signals per se, such as radio waves or other freely propagating electromagnetic waves, electromagnetic waves propagating through a waveguide or transmission media, or electrical signals transmitted through a wire.

Computer readable program instructions described herein can be downloaded to respective computing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network interface in each computing device receives computer readable program instructions from the network and forwards the computer readable program instructions for storage in a computer readable storage medium within the respective computing device.

Computer readable program instructions for carrying out operations of the present disclosure may be assembly instructions, instruction-set-architecture (ISA) instructions, machine instructions, machine dependent instructions, microcode, firmware instructions, state-setting data, or either source code or object code written in any combination of one or more programming languages, including an object oriented programming language, and conventional procedural programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a LAN or WAN, or the connection may be made to an external computer (for example, through the Internet). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

In various aspects, the systems and methods described in the present disclosure can be addressed in terms of modules. The term "module" as used herein refers to a real-world device, component, or arrangement of components implemented using hardware, such as by an application specific integrated circuit (ASIC) or FPGA, for example, or as a combination of hardware and software, such as by a microprocessor system and a set of instructions to implement the module's functionality, which (while being executed) transform the microprocessor system into a special-purpose device. A module may also be implemented as a combination of the two, with certain functions facilitated by hardware alone, and other functions facilitated by a combination of hardware and software. In certain implementations, at least a portion, and in some cases, all, of a module may be executed on the processor of a computer system (such as the one described in greater detail in FIG. 8, above). Accordingly, each module may be realized in a variety of suitable configurations, and should not be limited to any particular implementation exemplified herein.

In the interest of clarity, not all of the routine features of the aspects are disclosed herein. It would be appreciated that in the development of any actual implementation of the present disclosure, numerous implementation-specific decisions must be made in order to achieve the developer's specific goals, and these specific goals will vary for different implementations and different developers. It is understood that such a development effort might be complex and time-consuming, but would nevertheless be a routine undertaking of engineering for those of ordinary skill in the art, having the benefit of this disclosure.

Furthermore, it is to be understood that the phraseology or terminology used herein is for the purpose of description and not of restriction, such that the terminology or phraseology of the present specification is to be interpreted by the skilled in the art in light of the teachings and guidance presented herein, in combination with the knowledge of those skilled in the relevant art(s). Moreover, it is not intended for any term in the specification or claims to be ascribed an uncommon or special meaning unless explicitly set forth as such.

The various aspects disclosed herein encompass present and future known equivalents to the known modules referred to herein by way of illustration. Moreover, while aspects and applications have been shown and described, it would be apparent to those skilled in the art having the benefit of this disclosure that many more modifications than mentioned above are possible without departing from the inventive concepts disclosed herein.

What is claimed:

1. A method of providing a File System (FS) without redundancy for a plurality of services, the method comprising, using a hardware processor:
   mounting a base image of microservices to a directory;
   for each of the plurality of services, union-mounting a corresponding service image on top of the base image, identifying all dependencies associated with the corresponding service image, and creating one or more sub-directories for each dependency associated with the corresponding service image;
   for each identified dependency associated with the corresponding service image, linking a respective directory on the FS, storing respective files of the respective dependency, and the one or more sub-directories created for the respective dependency, wherein relationships between components of the FS are represented as a graph which contains cycles, the components of the FS including at least two of: the base image, the dependencies, and one or more libraries, wherein the respective files have been put to the respective directory on the FS, storing the respective files, during the respective dependency installation, wherein linking allows for accessing, via the one or more sub-directories, the respective files, stored in the respective directory on the FS, without coping the respective files to the one or more sub-directories;
   for each of the plurality of services, creating one or more micro-services on top of the corresponding union-mounted service image; and
   when a service accesses files for a service, accessing the respective files of the service via the one or more sub-directories stored in the respective directory of the FS without coping the respective files to the one or more sub-directories, and accessing the respective files of the service from the base image only when the files are not stored in the directory of the FS.

2. The method of claim 1, the plurality of services comprising at least one of: an application, a program and a micro-service.

3. The method of claim 1, the linking being performed using a bind mounts, hard links or symbolic links.

4. The method of claim 1, wherein, for each of the plurality of services, the one or more sub-directories for each dependency associated with the service image, the service image corresponding to the service, are created in the union-mounted service image on top of the base image mounted to the directory.

5. The method of claim 4, wherein the dependency is a package.

6. The method of claim 1, further comprising running one or more micro-services on top of the union-mounted service image.

7. The method of claim 1, wherein the dependency comprises one or more packages that are intersecting packages, intersecting packages being created in a same directory during the installation.

8. The method of claim 1, wherein the files are stored without redundancy, and wherein when the files are stored without redundancy, the files are created only once.

9. The method of claim 8, wherein files that are the same are identified by comparing at least one of: hash values, file names, and build IDs.

10. The method of claim 1, wherein a location is unique for a storage of a given dependency.

11. The method of claim 1, wherein the identification of the dependency is based on a description of the dependency as one of: a string in a metadata of the service image, a list of file names that are needed, and a checksum of contents of the dependency.

12. A system for providing a File System (FS) without redundancy for a plurality of services, the system comprising a computing device comprising a hardware processor configured to:
   mount a base image of microservices to a directory;
   for each of the plurality of services, union-mount a corresponding service image on top of the base image, identify all dependencies associated with the corresponding service image, and create one or more sub-directories for each dependency associated with the corresponding service image;
   for each identified dependency associated with the corresponding service image, linking a respective directory on the FS, storing respective files of the respective dependency, and the one or more sub-directories created for the respective dependency, wherein relationships between components of the FS are represented as a graph which contains cycles, the components of the FS including at least two of: the base image, the dependencies, and one or more libraries, wherein the respective files have been put to the respective directory on the FS, storing the respective files, during the respective dependency installation, wherein linking allows for accessing, via the one or more sub-directories, the respective files, stored in the respective directory on the FS, without coping the respective files to the one or more sub-directories;
   for each of the plurality of services, create one or more micro-services on top of the corresponding union-mounted service image; and when a service accesses files for a service, access the respective files of the service via the one or more sub-directories stored in the respective directory of the FS without coping the respective files to the one or more sub-directories, and access the respective files of the service from the base image only when the files are not stored in the directory of the FS.

13. The system of claim 12, the plurality of services comprising at least one of: an application, a program and a micro-service.

14. The system of claim 12, the linking being performed using a bind mounts, hard links or symbolic links.

15. The system of claim 12, wherein, for each of the plurality of services, the one or more sub-directories for each dependency associated with the service image, the service image corresponding to the service, are created in the union-mounted service image on top of the base image mounted to the directory.

16. The system of claim 15, wherein the dependency is a package.

17. The system of claim 12, further comprising running one or more micro-services on top of the union-mounted service image.

18. The system of claim 12, wherein the dependency comprises one or more packages that are intersecting packages, intersecting packages being created in a same directory during the installation.

19. The system of claim 12, wherein the files are stored without redundancy, and wherein when the files are stored without redundancy the files are created only once.

20. The system of claim 19, wherein files that are the same are identified by comparing at least one of: hash values, file names, and build IDs.

21. The system of claim 12, wherein a location is unique for a storage of a given dependency.

22. The system of claim 12, wherein the identification of the dependency is based on a description of the dependency as one of: a string in a metadata of the service image, a list of file names that are needed, and a checksum of contents of the dependency.

23. A non-transitory computer readable medium storing thereon computer executable instructions for providing a File System (FS) without redundancy for a plurality of services, including instructions for:

mounting a base image of microservices to a directory;

for each of the plurality of services, union-mounting a corresponding service image on top of the base image, identifying all dependencies associated with the corresponding service image, and creating one or more sub-directories for each dependency associated with the corresponding service image;

for each identified dependency associated with the corresponding service image, linking a respective directory on the FS, storing respective files of the respective dependency, and the one or more sub-directories created for the respective dependency, wherein relationships between components of the FS are represented as a graph which contains cycles, the components of the FS including at least two of: the base image, the dependencies, and one or more libraries, wherein the respective files have been put to the respective directory on the FS, storing the respective files, during the respective dependency installation, wherein linking allows for accessing, via the one or more sub-directories, the respective files, stored in the respective directory on the FS, without coping the respective files to the one or more sub-directories;

for each of the plurality of services, creating one or more micro-services on top of the corresponding union-mounted service image; and when a service accesses files for a service, accessing the respective files of the service via the one or more sub-directories stored in the respective directory of the FS without coping the respective files to the one or more sub-directories, and accessing the respective files of the service from the base image only when the files are not stored in the directory of the FS.

\* \* \* \* \*